June 16, 1942.   B. E. LENEHAN   2,286,820
REGULATOR
Filed Aug. 13, 1941
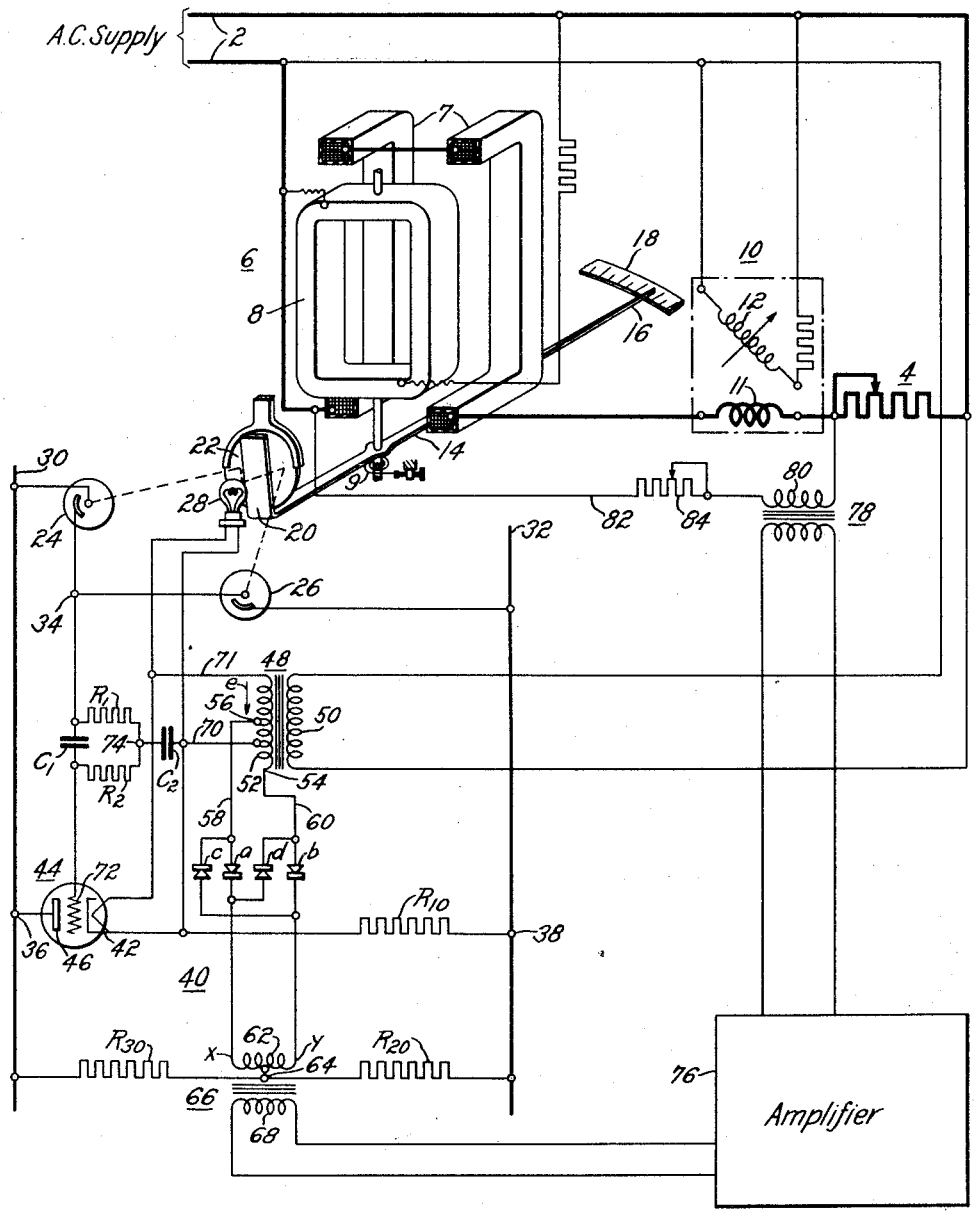
WITNESSES:
Wm. B. Sellers.
David Kreider.
INVENTOR
Bernard E. Lenehan.
BY
ATTORNEY Patented June 16, 1942

2,286,820

UNITED STATES PATENT OFFICE 2,286,820

REGULATOR

Bernard E. Lenehan, Bloomfield, N. J., assignor to Westinghouse Electric & Manufacturing Company, East Pittsburgh, Pa., a corporation of Pennsylvania Application August 13, 1941, Serial No. 406,673

20 Claims. (Cl. 175—183)

The present invention relates to regulators and, more particularly, to regulators for controlling the power through an electroresponsive device despite variations in the impressed voltage thereacross. Although not limited thereto, the invention has especial utility when employed with circuits for testing or calibrating electric power responsive instruments.

In calibrating wattmeter and watthour meters, for example, it is necessary to energize a standard instrument and test instrument at different load values such as full load, half load and the like. While these two instruments are being energized by the same amount of power, the instrument undergoing test is then adjusted to give the same reading as the standard instrument. Fluctuations in the indication of the standard instrument such as results from variations in the energy potential obviously make it difficult to obtain the proper calibration. This problem is also particularly serious in the case of thermal type demand meters where it is necessary to energize the wattmeter element uniformly for periods of one-half hour or more to obtain a satisfactory test. With the use of the present invention, however, the energization of both the standard and tested instrument may be maintained constant. A preferred embodiment for accomplishing this includes means adapted to provide in the standard instrument a corrective force having components proportional to its displacement from the desired position, the derivative of the displacement and the integral of the displacement to prevent unstable operation or "hunting."

It is, accordingly, an object of the present invention to provide a novel and improved regulator circuit.

Another object of the invention is to provide a simplified regulator circuit which may be made up of relatively inexpensive standard parts to produce a wide range of corrective force in response to small variations of a control member.

A further object of the invention is to provide an improved regulator circuit for maintaining the energization of a power responsive instrument or meter at a predetermined constant value during the testing or calibrating thereof.

Still another object of the invention is to provide an improved sensitive type bridge circuit and balance control means therefor.

Another object of the invention is to provide a circuit for obtaining a control voltage having components proportional to the displacement of a movable member, the derivative of the displacement and the integral of the displacement.

A still further object of the invention is to provide an optical lever arrangement for reacting to mechanical motion with increased sensitivity.

Other objects and advantages of the invention will appear from the following detailed description read in conjunction with the accompanying drawing, in which the single figure is a diagrammatic representation of a device embodying the invention.

The drawing shows the invention applied to a circuit for calibrating a wattmeter, or like power responsive element. A pair of conductors 2 are energized from an alternating current supply to in turn energize an impedance 4 which represents the load. This impedance 4 is preferably adjustable in value, as shown, so as to facilitate testing at various values of load and may, if desired, be made up of reactances as well as resistances in order to permit calibration at various power factors. A standard wattmeter 6 includes current coils 7 which are connected in series between one of the supply conductors and the load 4 and a movable voltage coil 8 which is connected in shunt across the load member 4. In addition, a power responsive instrument 10, which is to be tested or calibrated likewise, includes current coils 11 and a voltage coil circuit 12 which are connected in series and shunt, respectively, with the load impedance 4 so that the instrument is energized in substantially the same amount as the standard device 6. This instrument 10 may, for example, be a wattmeter, watthour meter, or power responsive portion of a maximum demand meter or any other device in which the power is to be maintained substantially constant. The wattmeter 6 further includes a movable arm 14 attached to its voltage coil 8 and may have an end 16 adapted to cooperate with a scale member 18. The circuit just described relates to the usual arrangement for calibrating instruments of this type.

The wattmeter 6 may further comprise an adjustable biasing spring 9, in which case the tension of the spring on the movable element may be varied to set the apparatus for different power measurements.

The arm 14 of the wattmeter 6 includes at its opposite end a shutter 20 which is adapted for disposition between a mirror 22 and a pair of light responsive members 24 and 26 which may be photocells of RCA type No. 922. The mirror 22 is adapted to be secured in a stationary manner at a position corresponding to the amount of energy passing through the meter 6 so that light from a lamp 28 falls equally upon each of light responsive devices when the shutter 20 is disposed in a position corresponding to that energization. This condition may be obtained for various power loads by varying the tension of the spring 9, in which case it becomes unnecessary to move the mirror lamp and photocell arrangement as would otherwise be required. The shutter 20, of course, moves with the arm 14 so as to increase the amount of light flowing on one of the light responsive devices and diminish that falling on the other when the power consumed by the load 4 varies from the selected value for the test.

As shown in the drawing, the lamp 28 is disposed close to the mirror 22 to provide high optical efficiency. The spacing of the lamp close to the shutter gives a high ratio of optical lever step-up to the mechanical displacement to provide maximum sensitivity. In addition, the shutter is preferably disposed obliquely to the mirror so that it will not itself reflect a portion of the light falling upon it to impair this sensitivity.

A pair of direct current energized conductors 30 and 32 are connected to the light responsive devices 24 and 26 which are interconnected in series at a junction designated as 34. The magnitude of this direct current supply is preferably such that the tubes 24 and 26 are saturated so that the current through each of them is directly proportional to the amount of light falling thereon.

The conductors 30 and 32 are further connected to opposite terminals designated as 36 and 38 of a bridge circuit 40. This bridge circuit comprises a resistance $R_{10}$ connected to the cathode 42 of an electron tube 44, the anode or plate 46 of which is connected to the bridge terminal 36. Also connected between the terminals 36 and 38 in series relationship to make up the other two arms of the bridge are resistance members $R_{20}$ and $R_{30}$.

A transformer designated as 48 includes a primary winding 50 which is connected to be energized from the alternating current conductors 2 and a secondary winding 52 which is connected to form a portion of the unbalance or "galvanometer" circuit for the bridge 40. To an end 54 and an intermediate point 56 of the secondary winding are connected conductors 58 and 60 which engage terminals of a transformer winding 62, the midpoint of which is connected between $R_{20}$ and $R_{30}$ at 64. This winding 62 forms the primary of an output transformer 66, which, in turn, includes a secondary winding at 68. In the conductors 58 and 60, respectively, are connected rectifier units $a$ and $b$ in a forward direction toward the transformer winding 62. At the same time, two other such rectifiers $c$ and $d$ are connected across the conductors 58 and 60 from the forward terminal of one of the first set of rectifiers to the rear terminal of the other of that set. These rectifiers are preferably of the contact type, such as copper-oxide rectifiers which have the property of varying in forward resistance in inverse proportion to the forward voltage impressed across them. The arrangement of these rectifiers in this manner results in a circuit in which the conducting characteristics may readily be changed in a manner which will be described more fully later.

By means of conductors 70 and 71 the secondary winding 52 of the transformer 48 is connected to energize the cathode filament 42 of the electron tube 44, as well as the lamp 28 from the alternating-current conductors 2. In addition, the junction point 34 between the light responsive devices is connected to a control grid 72 of the electron tube 44 with a capacitor $C_1$ disposed therebetween. A pair of series connected resistors $R_1$ and $R_2$ are further connected in shunt with this capacitor $C_1$ and a second capacitor $C_2$ is connected to a junction point 74 between the two resistors. The other end of the capacitor $C_2$ is connected to the cathode of the tube 44, which is connected to the winding 52 midway between conductors 54 and 56 by means of the conductor 70.

The secondary winding 68 of the transformer 66 is preferably connected to energize an amplifier 76 which is preferably of the linear or class A type to amplify both portions of an alternating current impressed thereon, and is relatively free from distortion. The output from this amplifier energizes the primary winding of another transformer 78 which includes a secondary winding 80. This secondary winding 80 is connected in shunt across the current coils 7 and 11 of the standard wattmeter and tested wattmeter, respectively, by means of a conductor 82. In addition, a variable resistor or potentiometer designated as 84 is preferably included in the circuit in series with the winding 80 to facilitate adjustment of its input into the current coils.

The bridge circuit 40 is designed so that the cathode-to-anode circuit of the tube 44 bears approximately the same relationship to the resistance $R_{30}$ as $R_{10}$ bears to $R_{20}$. In a particular embodiment placed in operation $R_{20}$ and $R_{30}$ were made equal to 5,000 ohms, while $R_{10}$ equaled 20,000 ohms.

In operating the device, the apparatus including the load impedance 4 is adjusted with the shutter 20 between the lamp and mirror in such position that equal amounts of light are reflected upon the photocells 24 and 26. Under these circumstances the bridge circuit 40 is balanced, and there is no flow of direct current through the unbalance arm therebetween. In the absence of such an unbalance current, the impedance of the rectifiers $a$, $b$, $c$, and $d$ will prevent the flow of any alternating current from the winding 52 of the transformer 48 to energize the winding 62 of the transformer 66. At this time, however, the cathode 42 of the tube 44 and the lamp 24 are both energized in the proper amount since their energization is independent of the circuit including the rectifiers. In the absence of any alternating current flowing through the winding 62, there will, of course, be no energization of the amplifier or the primary of the transformer 78.

Upon movement of the shutter 20 from its balanced position in response to a variation in the alternating current voltage across the standard instrument 6, or the like, the amount of light on one of the light responsive devices will be increased, and that upon the other will be decreased. This, in turn, results in a flow of current in the junction 34 between the light responsive devices, and such a flow of current acts through the impedance circuit made up of capacitors $C_1$ and $C_2$ and resistances $R_1$ and $R_2$ to unbalance the bridge 40 in a corresponding direction. Assuming, for example, that the unbalance is such that the cathode 42 is positive with respect to the bridge junction 64, it will appear that the unbalance current will flow through the rectifiers $a$ and $b$ to the junction 64 and thence through bridge arms $R_{20}$ and $R_{10}$ to the cathode again. If at the same time, the induced current in the transformer winding 52 is in a downward direction as shown by the arrow $e$, current will flow through the conductor 60, rectifier $b$, and right-hand portion $y$ of the winding 62 to the junction 64, and from there through $R_{20}$, $R_{10}$, to the cathode 42 and the point on the winding 52 midway between conductors 54 and 56.

The direction of the output current of the transformer 66 is thus toward the right because the primary current flows from right to left from the right-hand half of the primary 62 during this particular portion of the cycle. It will readily appear that with this same unbalance current, the alternating current will flow from left to right through the left-hand portion $x$ of the winding 62 during the opposite half of the current cycle. If, however, the unbalance of the bridge circuit 40 is such that the junction 64 is positive relative to the cathode 42, the flow of unbalance direct current is in the direction opposite to that just described and will result in the rectifiers $c$ and $d$ becoming of lower impedance. As a result of this, the current output of the transformer 66 to the amplifier will be in exactly opposite phase relationship to that just set forth.

The output of the transformer 66 will be amplified by the amplifier 76 so that a regulating current is passed through the conductor 82 and the current coils 7 and 11. The construction of the device is, of course, such that this regulating current will be additive to that normally flowing through these current coils when the shutter 20 has moved in a direction corresponding to a reduction in the power through the standard wattmeter 6 and will thus tend to bring the shutter 20 back to its original selected position. Where the energization of the wattmeter 6 has become greater than is desired, however, the movement of the shutter 20 will be in the opposite direction to that just described, and the total energization of the current coils will be decreased.

The impedance circuit connected between the cathode and control grid of the bridge circuit tube and the junction between the light sensitive tubes controls the relationship between the junction current or displacement of the meter 6 and the variation in control grid potential. The circuit shown in the drawing acts with the remainder of the apparatus to produce a corrective force proportional to: (1) the time integral of displacement to correct for slow drift, (2) displacement under changing conditions only to give the effect of stiffer spring and more rapid response, and (3) time rate of change of displacement or velocity resulting in damping and the suppression of oscillations. For this particular circuit the voltage impressed between the cathode and grid bears the following relation to the junction current $i$ where $P$ represents the differentiating factor $$\frac{d}{dt}$$

$$e = \left(\frac{1}{PC_2} + \frac{PC_1 R_1 R_2}{1 + PC_1(R_1 + R_2)}\right)i$$

To further illustrate the operation of the invention, the actual characteristics of a device constructed in accordance therewith are given herein by way of example. In this device, the mechanical and electrical features are as follows:

Moment of inertia = $I$ = 5000 gm. cm.$^2$
Spring torque = $K$ = 2000 dyne cm. per radian.
Periodic time = $T$ =

$$2\pi\sqrt{I/K} = 9.92 \text{ secs.}$$

Electrical torque = 12,500 dyne cm. for 250 watts.
= 50 dyne cm. per watt.

The elements in the impedance circuit employed have the following values:

$R_1 = R_2 = 5$ megohms
$C_1 = .01$ microfarad
$C_2 = .5$ microfarad

In addition, the light responsive tube system delivers .667 microampere for .01 radian deflection, and the device produces 30 watts in meter 6 per volt on the grid of tube 44.

With these constants $$e = i\left(\frac{1}{.5P} + \frac{.25P}{1 + .1P}\right)$$

and the total corrective force resulting from .01 radian deflection equals $$\frac{2000}{P} + \frac{250P}{1 + .1P}$$

or $$\text{torque } M = \left(\frac{200,000}{P} + \frac{25,000P}{1 + .1P}\right)\theta$$

The maximum available electrical torque is 12,500 dyne cms., and the maximum travel of the movable member is about .05 radian. The maximum acceleration thus equals 2.5 radians per sec.$^2$, and the maximum velocity equals .5 radian per second. The maximum value of the differentiating factor.

$$P = \frac{.5}{.05} = 10$$

The normal differential equation of motion for the mechanical system of 6 is $$IP^2\theta + DP\theta + K\theta = 0$$

For stable operation, it is necessary that this represent a type of motion whose amplitude diminishes with time at preferably a rapid rate. Where no mechanical damping exists, $D = 0$, and the effect of the regulating equipment is to introduce other terms in the equation giving the new equation $$IP^2\theta + DP\theta + K\theta + \left[\frac{200,000}{P} + \frac{25,000P}{1 + .1P}\right] = 0$$

as $D = 0$, $I = 5,000$, and $K = 2,000$, dividing by 5,000 gives $$P^2\theta + .4\theta + \frac{40}{P}\theta + \frac{5P\theta}{1 + .1P} = 0$$

Since $P$ has a range of 0 to 10, and $\theta$ varies up to .05, the third term is negligible, and the approximate equation $$P^2\theta + (2.5 \text{ to } 5) P\theta + .4\theta = 0$$

may be substituted. For critical damping, the coefficient of $P\theta$ should be $$2\sqrt{.4 \times 1} = 1.26$$

As the range of 2.5 to 5 is greater than this critical value, the operation of the device is stable, and no overshooting will occur.

It will appear that this stable response proportional to the displacement, its integral and derivative results from the characteristics of the impedance circuit connected to the junction between the light responsive devices. The circuit arrangement which provides a voltage having components proportional to these quantities is consequently considered an important part of the present invention.

From the above description, it will also be evident that a regulator may be made in accordance with the invention from ordinary equipment which is readily available commercially, so that the cost is considerably less than it would be were specially constructed parts necessary to handle the power magnitude involved. The employment of the electron tube as a portion thereof results in a bridge circuit which is sufficiently responsive to the small unbalance currents from the light responsive devices to give a practical controlling force. In addition, the fact that the regulating current flows in opposite phase relationships, and thus may be either added or subtracted to the normal current results in it being possible to employ an amplifier of smaller capacity than would otherwise be necessary. The optical lever system employed permits reduced voltage operation because of its high sensitivity, and thus provides greater freedom from replacements.

It will be understood that the illustrated embodiment of the invention has been shown by way of example only, and that various modifications in this particular arrangement will be evident to those skilled in the art. In addition, various features of the apparatus will be found useful either alone or in other arrangements. It is consequently intended that the invention shall be limited only by the appended claims interpreted in view of the prior art.

I claim as my invention:

1. In combination, an alternating current responsive device, an alternating current source, a circuit interconnecting said source and said device, means in said circuit for normally preventing any substantial energization of said device therethrough, said means being responsive to a flow of direct current therethrough in either of opposite directions to permit energization of said device in respectively corresponding opposite phase relationships, and means responsive to variations of a controlling quantity from a predetermined value to pass a direct current through said direct current responsive means in either of opposite directions.

2. In combination, an alternating current responsive device operable in accordance with the phase and magnitude of its energization current, an alternating current source, a circuit interconnecting said source and said device, means in said circuit for normally preventing any substantial energization of said device therethrough and responsive to a flow of direct current therethrough in either of opposite directions to permit energization of said device in respectively corresponding opposite phase relationships in accordance with a function of said direct current, and means displaceable from a predetermined position in opposite directions to pass a direct current varying in accordance with a function of its displacement through said direct current responsive means in a direction dependent upon the direction of the displacement.

3. In combination, an alternating current responsive device operable in accordance with the phase and magnitude of its energization current, an alternating current source, a circuit interconnecting said source and said device, means in said circuit for normally preventing any substantial energization of said device therethrough, said means being responsive to a flow of unidirectional current therethrough in either of opposite directions to permit energization of said device in respectively corresponding opposite phase relationships in accordance with a function of said unidirectional current, a bridge circuit adapted to produce a unidirectional unbalance current when in unbalanced condition, means connecting said interconnecting circuit to be traversed by the unidirectional unbalance current of said bridge circuit, and means displaceable from a predetermined position in opposite directions to unbalance said bridge circuit in a direction corresponding to the displacement thereof in accordance with a function of such displacement.

4. In combination, an alternating current responsive device operable in accordance with the phase and magnitude of its energization current, an electron tube including a cathode, anode and control member, means electrically connected to said tube to form a normally balanced bridge circuit with the cathode to anode circuit of said tube disposed in an arm thereof, a direct current supply for energizing said bridge circuit, an alternating current source, a circuit interconnecting said source and said device and including means for normally preventing any substantial energization of said device, said last named means being responsive to a flow of direct current therethrough in either of opposite directions to permit energization of said device in respectively corresponding opposite phase relationships in accordance with a function of the direct current, means connecting said interconnecting circuit across said bridge circuit to be traversed by its unbalance current, and means displaceable from a predetermined normal position in opposite directions to vary the potential on the control member of said tube to unbalance said bridge circuit in a direction corresponding to its displacement in accordance with a function of such displacement.

5. In combination, an alternating current responsive device operable in accordance with the phase and magnitude of its energization current, an alternating current source, a circuit interconnecting said source and said device, means in said circuit for normally preventing any substantial energization of said device therethrough, said means being responsive to a flow of direct current therethrough in either of opposite directions to permit energization of said device in respectively corresponding opposite phase relationships in accordance with a function of said direct current, a normally balanced bridge circuit, a direct current supply for energizing said bridge circuit, means connecting said interconnecting circuit across opposite points of said bridge circuit to be traversed by unbalance currents therein, a pair of series connected light responsive devices connected to said bridge circuit to cause an unbalance current therein in a corresponding direction when the relationship between the light on them is changed from a predetermined normal ratio in opposite directions, and means for controlling the actuation of said light responsive devices including a member displaceable in opposite directions from a predetermined normal position to change the relationship between the light on said devices.

6. In combination, a transformer, an electron tube including a cathode, anode and control member, means connected to said tube to form a normally balanced bridge circuit with the cathode to anode circuit of said tube disposed in an arm thereof, a direct current supply for energizing said bridge circuit, a pair of series connected light responsive devices connected across a pair of adjacent arms in opposed portions of said bridge circuit, one of said pair of arms being that including said tube circuit, means electrically connecting said control member to a point between said light responsive devices with an impedance disposed between it and said cathode, an alternating current source, a circuit interconnecting said source and the input side of said transformer and comprising means for normally preventing any substantial energization of said transformer therethrough, said last-named means being responsive to the passage of direct current therethrough in either of opposite directions to permit energization of said transformer in respectively corresponding opposite phase relationships in accordance with a function of said direct current, means connecting said interconnecting circuit to be traversed by the unbalance current in said bridge circuit, and means for normally activating said light responsive means in such manner that the control member of the tube is maintained at the proper potential to balance said bridge circuit, said last-named means including a member displaceable in opposite directions from its normal position to change the relationship of the light on said devices to cause an unbalance of said bridge circuit in a direction corresponding to and a magnitude in accordance with a function of the displacement thereof.

7. In combination, an electron tube including a cathode, anode and control member, means connected to said tube to form a normally balanced bridge circuit with the cathode to anode circuit of said tube disposed in an arm thereof, a direct current supply for energizing said bridge circuit, a balance control circuit connected across a pair of adjacent arms in opposed portions of said bridge circuit, one of said arms being that including said tube circuit, means electrically connecting said control member to said balance control circuit through an impedance circuit to normally maintain it at such potential as to place said bridge circuit in balanced condition, means including a member displaceable in opposite directions from a predetermined normal position to operate said balance control circuit to correspondingly change the voltage of said control member from its normal value, and a device operable in accordance with the direction and magnitude of a current therethrough connected to said bridge circuit to be energized by its unbalance current.

8. In combination, an electron tube including a cathode, anode and control member, means connected to said tube to form a normally balanced bridge circuit with the cathode to anode circuit of said tube disposed in an arm thereof, a direct current supply for energizing said bridge circuit, a pair of series connected light responsive devices connected across a pair of adjacent arms in opposed portions of said bridge circuit, one of said pair of arms being that including said tube circuit, means electrically connecting said control member to a point between said light responsive devices and to said cathode through an impedance circuit, means for normally exposing said light responsive devices to such amounts of light that the control member of the tube is maintained at such potential as to balance said bridge circuit, said last-named means including a member displaceable in opposite directions from its normal position to change the relationship of the light on said devices in such manner as to vary the potential of said control member from its normal value in a direction corresponding to an amount proportional to the displacement, and a device operable in accordance with the direction and magnitude of a current therethrough connected to said bridge circuit for energization by its unbalance current.

9. In combination, an electron tube including a cathode, anode and control member, means connected to said tube to form a normally balanced bridge circuit with the anode to cathode circuit of said tube disposed in a first arm thereof and a resistance member connected to said cathode to form a second arm normally balancing said first arm, a pair of series connected light responsive devices connected to the ends of said first and second arms remote from said cathode, a direct current source connected across said series connected light responsive devices for energizing them and said bridge circuit, an impedance circuit connected between said cathode, control member and the junction between said light responsive devices to maintain said control member at such potential that said first and second bridge arms are balanced when said light responsive devices are exposed to equal amounts of light, means for normally exposing said light responsive devices to such equal amounts of light and including a member displaceable in opposite directions from its normal position to change the relationship of the light on said devices in such manner as to cause a current to flow in said impedance circuit to vary the potential of said control member from its normal value in a direction corresponding to and an amount proportional to the displacement, a device operable in accordance with the direction and magnitude of a current therethrough, and means connecting said device to said bridge circuit for energization by its unbalance current.

10. In combination, an electron tube including a cathode, anode and control member, means connected to said tube to form a normally balanced bridge circuit with the anode to cathode circuit of said tube disposed in a first arm thereof and a resistance member connected to said cathode to form a second arm normally balancing said first arm, a pair of series connected light responsive devices connected to the ends of said first and second arms remote from said cathode, a direct current source connected across said series connected light responsive devices for energizing them and said bridge circuit, said direct current source having such a potential as to saturate said light responsive devices so that the current through each of them is proportional to the amount of effective light to which it is exposed, a capacitor connected between said control member and the junction between said light responsive devices, a pair of equal resistances one end of each of which is connected to opposite sides of said capacitor, means interconnecting the other ends of said resistances, a second capacitor connected between said cathode and the junction between said resistances, said capacitors and resistances being designed to vary the potential on said control member from a predetermined bridge balancing value in accordance with the difference in current through said light responsive devices and the derivative and integral thereof, means for normally exposing said light responsive devices to such equal amounts of light and including a member displaceable in opposite directions from its normal position to change the relationship of the light on said devices to cause a difference in current therethrough in a direction corresponding to and an amount proportional to the displacement, a device operable in accordance with the direction and magnitude of a current therethrough, and means connecting said last-named device to said bridge circuit for energization by its unbalance current.

11. In combination, a transformer including a primary winding, a normally balanced bridge circuit adapted to produce a unidirectional unbalance current when in unbalanced condition, an alternating current source, a circuit connecting the primary winding of said transformer across said current source and including a pair of conducting arms each of which has disposed therein a pair of oppositely disposed contact type half wave rectifiers, a shunt circuit connected between each end of said primary winding and the junction between said current source and the rectifier in the opposite arm of the interconnecting circuit, each of said shunt circuits having therein a contact type half wave rectifier disposed in opposite relationship to its said junction to that of the rectifier disposed in the connecting circuit arm containing said junction, means connecting an intermediate point of said current source and an intermediate point of said primary winding to said bridge circuit to pass the unbalance current therethrough so that said primary winding is energized from said alternating current source in a phase relationship and magnitude dependent on the direction and magnitude respectively of unbalance of said bridge circuit, and means displaceable from a predetermined position in opposite directions to unbalance said bridge circuit in a direction corresponding to the displacement thereof to an extent dependent on the magnitude of such displacement.

12. In combination with an instrument to be tested having cooperating current and voltage coils, a load circuit, an alternating current source for energizing said load circuit, a standard instrument having cooperating current and voltage coils, means connecting the current coils of said instruments in series with each other to be traversed by a current proportional to that in said load circuit, means connecting the voltage coils to be energized in proportion to the voltage across said load circuit, a regulator circuit connected across the series connected current coils, said regulator circuit including an alternating current responsive device operable to introduce therein a current of a phase and magnitude corresponding and proportional, respectively, to like properties of its own energization current, a circuit interconnecting said device with said alternating current source, means in said interconnecting circuit for normally preventing any substantial energization of said device, said last-named means being responsive to a flow of direct current therethrough in either of opposite directions to permit energization of said device in respectively corresponding opposite phase relationships in proportion to the magnitude of said direct current, and means including a member displaceable from a predetermined position in opposite directions in accordance with a function of variations in the product of the voltage and current in said standard instrument from a predetermined value to pass a direct current varying in accordance with a function of the displacement through said direct current responsive means in a direction dependent upon the direction of the displacement.

13. In combination with an instrument to be tested having cooperating current and voltage coils, a load circuit, an alternating current source for energizing said load circuit, a standard instrument having cooperating current and voltage coils, means connecting the current coils of said instruments in series with each other to be traversed by a current proportional to that in said load circuit, means connecting the voltage coils to be energized in proportion to the voltage across said load circuit, a regulator circuit connected across the series connected current coils and including a transformer operable to introduce therein a current of a phase and magnitude corresponding and proportional, respectively, to like properties of its own energization current, means including a normally balanced bridge circuit for energizing said transformer from said alternating current source in a phase relationship corresponding to the direction of an unbalance current in said bridge circuit in proportion to the magnitude of said unbalance current, a member displaceable from a predetermined position in opposite directions in proportion to variations in the product of the voltage and current in said standard instrument from a predetermined value, and means including a pair of light responsive devices connected to said bridge circuit and responsive to the displacement of said displaceable member to unbalance said bridge circuit to cause said transformer to impose on said regulator circuit a current of a phase relationship and magnitude tending to maintain the current through said current coils of such value that the product of the voltage and current in said standard instrument remains at said predetermined value.

14. In combination, an electro-responsive device including current and voltage elements, a power measuring device including current and voltage elements and a member movable in accordance with the power therethrough, an alternating current source for energizing said devices in substantially equal amounts, regulating means for superimposing on the current elements of said devices a current corresponding to the phase and magnitude of its own energization, means responsive to a direct current voltage impressed thereacross in either of opposite directions to energize said regulating means from said alternating current source in respectively corresponding phase relationships in proportion to the magnitude of said direct current, and means operable in response to the displacement of said movable member from a predetermined position to impose on said last-named means a direct current voltage including components proportional to the displacement of said movable member and the derivative and integral of such displacement to cause said regulating means to superimpose on said current elements a current in a direction tending to restore said movable member to its predetermined position.

15. In combination, an electro-responsive device including current and voltage elements, a power measuring device including current and voltage elements, a power measuring device including current and voltage elements and a member movable in accordance with the power therethrough, an alternating current source for energizing said devices in substantially equal amounts, regulating means for superimposing on the current elements of said devices a current corresponding to the phase and magnitude of its own energization, means responsive to a direct current voltage impressed thereacross in either of opposite directions to energize said regulating means from said alternating current source in respectively corresponding phase relationships in proportion to the magnitude of said direct current, a pair of similar light responsive devices, a direct current supply for energizing said light responsive devices in series circuit, means responsive to the displacement of said movable member from a predetermined position to unbalance the light disposed on said light responsive devices in a direction and magnitude in accordance with said displacement, an impedance circuit connected to said light responsive devices to provide a direct current voltage including components proportional to the displacement of said movable member and the derivative and integral thereof, and means connecting the direct current responsive means for energization by the voltage from said impedance circuit to cause said regulating means to superimpose on said current elements a current of such phase and magnitude as to restore said movable member to its predetermined position.

16. In a control circuit, a pair of similar electro-responsive devices, a direct current supply, means connecting said supply to pass a current through said devices in series, a circuit comprising a first capacitor and a resistance in parallel and means connecting a terminal thereof to the junction between said devices, a second capacitor having a first terminal engaging substantially the midpoint of said resistance and a second terminal connected to one of said devices opposite said junction with the other said device, and means including a member movable from a predetermined position for differentially affecting the current through said devices in accordance with its displacement to provide between the second terminal of said capacitor and the free terminal of said parallel circuit a voltage having components proportional to the displacement of said movable member and the derivative and integral of such displacement.

17. In combination, a pair of series connected light responsive devices, a direct current supply for energizing said devices, a member movable from a predetermined position to unbalance the light on said devices in accordance with its displacement, a circuit comprising a first capacitor and a resistance in parallel, means connecting a terminal of said circuit between said light responsive devices, and a second capacitor connected between the midpoint of said resistance and an outside terminal of one of said devices to provide between said outside terminal and the free terminal of said shunt circuit a voltage having components proportional to the displacement of said movable member and the derivative and integral of such displacement.

18. In a control device, a pair of similar light responsive devices, a direct current supply, means for energizing said light responsive devices in series circuit across said direct current supply, a circuit comprising a first capacitor and a resistance in parallel and means connecting a terminal thereof to the junction between said light responsive devices, a second capacitor having a first terminal engaging substantially the midpoint of said resistance and a second terminal connected to an outside terminal of one of said devices, and means for varying the amount of light to which said devices are subjected including a member movable in opposite directions from a predetermined position for unbalancing the currents therethrough to provide between the second terminal of said second capacitor and the free terminal of said parallel circuit a voltage having components proportional to the displacement of said movable member and the derivative and integral of such displacement.

19. In combination, a pair of series connected light responsive devices, a bridge circuit, a direct current supply for energizing said devices and said bridge circuit, a circuit comprising a first capacitor and a resistance connected in parallel, a second capacitor connected between substantially the midpoint of said resistance and a junction of said bridge circuit, means for varying the amount of light to which said devices are subjected including a member movable in opposite directions from a predetermined position for unbalancing the currents therethrough in accordance with the magnitude and direction of its displacement, and means connecting said parallel circuit between the junction between said devices and a portion of said bridge circuit to supply the latter with a voltage having components proportional to the displacement of said movable member and the derivative and integral of such displacement.

20. In a control circuit, a light source, a pair of light responsive devices, a mirror disposed substantially closer to said light source than to said devices to normally reflect the light therefrom upon said devices in equal amounts, a direct current supply for energizing said devices in series circuit with a saturating potential, a shutter disposed between said light source and said mirror and movable in either of opposite directions from a position normally permitting said mirror to reflect an equal amount of light on each of said devices to unbalance the light thereon with a leverage action in accordance with the variations in a controlling quantity, and a controlled device connected for energization in accordance with the direction and magnitude of the difference in current through said devices.

BERNARD E. LENEHAN.